Dec. 26, 1950 A. C. LOWTHER 2,535,688

FILING AND INDEXING SYSTEM FOR PHONOGRAPH RECORDS

Filed Feb. 24, 1949

INVENTOR.
Alexander C. Lowther,

BY Victor J. Evans & Co.

ATTORNEYS

UNITED STATES PATENT OFFICE 2,535,688

FILING AND INDEXING SYSTEM FOR PHONOGRAPH RECORDS

Alexander C. Lowther, Alexandria, La.

Application February 24, 1949, Serial No. 78,141

2 Claims. (Cl. 312—13)

The present invention relates to improvements in phonograph record storing and handling cabinets, and more particularly to a removably mounted record receiving envelope for holding individual records.

One object of the invention is to provide a record receiving and handling cabinet for phonograph records with a rockably mounted record receiving envelope which is adapted to be rocked to and fro on a supporting rod in the cabinet as a fulcrum point and to provide said envelope with a fulcrum rod receiving slot so arranged as to enable easy removal of the envelope when desired and yet preventing removal during the normal movement thereof to and fro in said cabinet.

Another object is to provide a record receiving envelope for phonograph record storing cabinets in which the fulcrum rod receiving slot extends downwardly and forwardly from the rear end edge of the envelope whereby accidental removal of the envelope will be prevented during the rocking motion of said envelope when storing or removing records therefrom.

Another object is to provide a record receiving envelope in which the fulcrum rod receiving slot is reinforced by a type of construction which utilizes four thicknesses of the envelope material, so that the sections, when glued together, form a hard mass to thereby prevent tearing or damage to the edges of said slot from pulling and pushing forces exerted on the envelope while removing or replacing records therein.

Another object is to provide a phonograph record storing and indexing cabinet for receiving individual record receiving envelopes which is provided with a forward rest bar adapted to engage the front vertical edge surface of the envelopes when they are tilted or rocked to a record receiving or removing position. The forward rest bar being arranged in spaced apart relation from the fulcrum rod and disposed slightly below the horizontal level thereof to position the record receiving envelope at an angle of repose with the open end presented for receiving and removing records with ease and facility.

Another object of the invention is to provide a record receiving and indexing cabinet having a series of individual record receiving envelopes, each of which is provided with an index tab normally projecting from the cabinet when the record receiving envelope is in its stored position whereby said index tabs will be readily visible to facilitate the quick selection of records and withdrawal thereof from said cabinet.

Another object is to provide a record receiving and indexing cabinet having a series of individual record holding envelopes which are constructed and formed in such a manner as to balance the records in a stored position with the peripheral edge thereof in contact with the fulcrum rod at a point displaced forwardly from the vertical center of said record.

Other objects and advantages of the invention will become apparent during the course of the following description of the accompanying drawing wherein.

Figures 1, 2, 3, 4, 6:
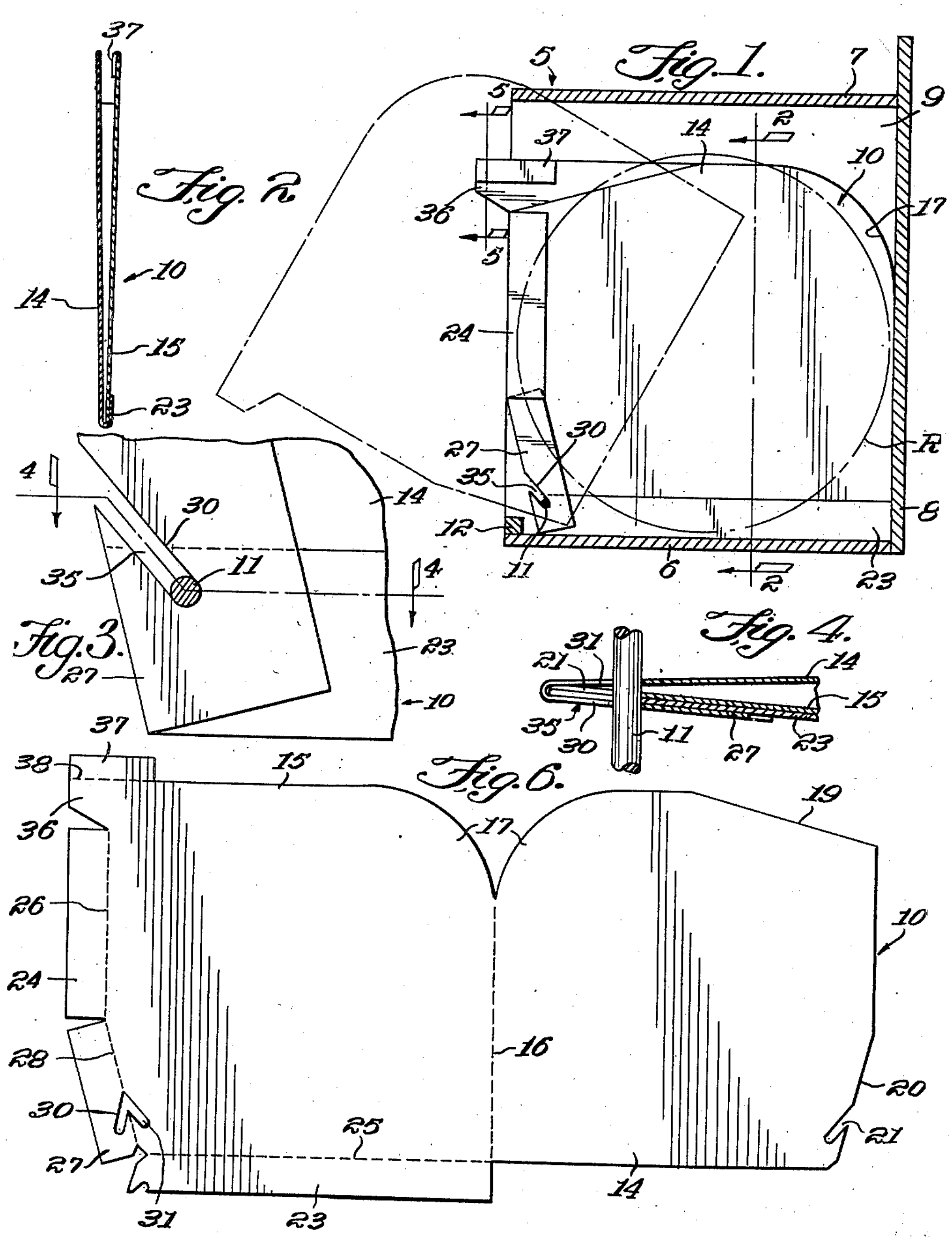
Figure 1 is a vertical cross-sectional view of a record storing and indexing cabinet showing the record receiving envelope in side elevation and the manner in which the same is rockably and removably supported on the fulcrum rod.
Figure 2 is a vertical cross-sectional view taken on line 2—2 of Figure 1 and looking in the direction of the arrows to illustrate various structural details.
Figure 3 is an enlarged fragmentary side elevational view showing the fulcrum rod in section and the manner in which the envelope is supported when in its stored position.
Figure 4 is a horizontal cross-sectional view taken on line 4—4 of Figure 3 further showing various structural features of the envelope and the manner in which the same is reinforced.
Figure 5 is a fragmentary vertical cross-sectional view taken on line 5—5 of Figure 1 and looking in the direction of the arrows to show the index tab and Figure 6 is a plan view of the envelope blank showing the various fold lines and the slots in the opposed sections for forming the fulcrum rod receiving slot.
Figure 5:
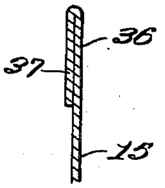

In the drawing, and more in detail, there is shown in Figure 1 for the purpose of convenience of illustration a record storing and indexing cabinet 5 having bottom, top and rear walls 6, 7 and 8 respectively. Suitable end walls (not shown) are provided and a plurality of vertical division plates or partitions 9 are secured between the bottom and top walls 6 and 7 to divide the cabinet into a series of compartments, each of which is intended to hold a predetermined number of record receiving envelopes generally designated 10. Extending through the vertical partition walls 9 adjacent the front edge of the bottom wall 6 is a fulcrum rod 11 upon which the envelopes 5 are adapted to be rockably mounted and a supporting strip 12 is secured to the extreme front edge of the bottom wall 6 to support the envelope 5 when the same is moved to the dotted line position Figure 1 for insertion or removal of phonograph records.

The envelope 10 is formed from a blank (Figure 6) and includes wings 14 and 15 adapted to be folded on a central line 16 to form the side walls of the envelope. Each of the wings 14 and 15 is cut away as at 17 converging in the direction of said central line 16 to remove the corner portion when the wings are folded and permit the envelope 10 to swing into and out of the cabinet 5. The wing 14 has its upper and lower corners 19 and 20 angularly cut, and formed in the wing 14 and extending inwardly from the angular cut edge 20 is a slot 21. The other wing 15 is shaped to correspond to the wing 14 insofar as the angular edge 20 is concerned, and the bottom and side edges are provided with flaps 23 and 24 adapted to be folded on the dotted lines 25 and 26. An angular portion or flap 27 is formed on the wing 15 and is likewise adapted to be folded on the dotted line 28 which conforms in direction to the angular wall 20 so that when the wings 14 and 15 are folded upon themselves about the fold line 16 the flap 23 may overlie the lower edge of the wing 14 and be adhesively affixed thereto. Similarly, the flap 24 will overlie the vertical edge of the wing 14 and may likewise be adhesively secured thereto. Formed in the wing 15 and flap 27 is a pair of angular notched portions 30 and 31 extending at right angles one to the other with their intersecting points on the dotted line 28, so that when the flap 27 is folded over the edge 20 of the wing 14 and adhesively affixed thereto the slots 30 and 31 will fall on opposite sides of the slot 21 and form a slot generally designated 35 (Figs. 1 and 3), extending in a direction tangential to the centroidal point of the envelope 10 and opening forwardly and upwardly adjacent the front edge of the envelope.

The upper corner edge of the wing 15 corresponding to the angularly cut edge 19 of the wing 14 is provided with a projection 36 having a tab 37 adapted to be folded on the dotted line 38. The tab 37 is folded against the projection 36 and adhesively secured thereto to form a reinforced indexing tab which projects above the angular edge 19 of the wing 14 to facilitate separation of the side walls or wings 14 and 15 of the envelope when inserting or removing a record R shown in dotted lines in Figure 1.

It is to be understood, that a plurality of such record receiving envelopes may be provided for the cabinet 5 and that said envelopes are inserted in the cabinet between the vertical partitions 9 so that the tangential slot 35 will receive the fulcrum rod 11. In this position (Fig. 1), a pull force outwardly on the tab 36 will cause the envelope to rock about said fulcrum rod 11 to the dotted line position, whereby the angular edge 20 will rest upon the longitudinal supporting strip 12 and retain the envelope to position for insertion or removal of phonograph records.

When a record R is inserted in the envelope 10 and the same moved to its stored position (full lines, Figure 1) the center of the record will position itself rearwardly of the fulcrum rod 11 and the peripheral edge of the record will engage said rod so as to prevent forward rolling movement of the record and accidental displacement of the record and envelope. Various identifying indicia can be marked or printed on the folded portion 37 of the tab 36 to facilitate handling of the phonograph records and the correct indexing and selection thereof.

The slot 35 is arranged so that the envelopes containing records therein can be readily inserted into and withdrawn from the cabinet.

Further, the area around the slot 35 is ruggedly constructed by means of four thicknesses of material to thereby provide a tough structure and the envelopes can be fabricated inexpensively. The flap 23 serves to reinforce the lower portion of the slot and this is advantageous since the lower portion will be subjected to more strain than the upper portion thereof.

It is to be understood that the form of the invention herewith shown and described is to be taken as a preferred form thereof and that various changes in the shape, size and arrangement of parts may be resorted to without departing from the spirit of the invention or the scope of the subjoined claims.

I claim:

1. In combination, a cabinet, a fulcrum rod supported by said cabinet, an envelope for phonograph records rockably mounted on said rod, said rod being arranged adjacent the forward lower edge of said envelope, said envelope comprising a blank having complementary winged portions adapted to be folded on a central fold line, at least two of the opposed corners of said envelope being cut away to provide angular corner portions, tabs along the side and bottom edges of one of said wing portions for being adhesively sewed to the corresponding portions of the other wing in overlapping relation therewith, said envelope being provided with an inwardly and downwardly directed slot opening inward from the forward edge of said envelope in the area of one of the tabs, and an indexing extension on the upper forward edge of said envelope for receiving record identifying indicia.

2. In combination, a cabinet, a fulcrum rod supported by said cabinet, an envelope for phonograph records rockably mounted on said rod, said rod being arranged adjacent the forward lower edge of said envelope, said envelope comprising a blank having complementary winged portions adapted to be folded on a central fold line, at least two of the opposed corners of said envelope being cut away to provide angular corner portions, tabs along the side and bottom edges of one of said wing portions for being adhesively sewed to the corresponding portions of the other wing in overlapping relation therewith, said envelope being provided with an inwardly and downwardly directed slot opening inward from the forward edge of said envelope in the area of one of the tabs, and an indexing extension on the upper forward edge of said envelope for receiving record identifying indicia, said fulcrum rod receiving slot being arranged forwardly of the centroidal point of said envelope such that a record placed therein will be balanced rearwardly of said fulcrum rod and exert a rearward force on said envelope in the direction of the rear wall of the storing cabinet.

ALEXANDER C. LOWTHER.

REFERENCES CITED

The following references are of record in the file of this patent:

UNITED STATES PATENTS

| Number | Name | Date |
|---|---|---|
| 1,321,222 | Malocsay | Nov. 11, 1919 |
| 1,403,482 | Breitman | Jan. 7, 1922 |

FOREIGN PATENTS

| Number | Country | Date |
|---|---|---|
| 237,643 | Great Britain | July 28, 1925 |